3,555,161
PARA - ALKENYLPHENOXY - HYDROXY - ISOPRO-
PYLAMINOPROPANE IN THE TREATING OF
CARDIAC AND VASCULAR DISEASES

Arne Elof Brandstrom, Goteborg, Hans Rudolf Corrodi, Askim, and Bengt Arne Hjalmar Ablad, Goteborg, Sweden, assignors to Aktiebolaget Hassle, Molndal, Sweden, a company of Sweden No Drawing. Continuation-in-part of application Ser. No. 558,226, June 17, 1966, which is a continuation-in-part of application Ser. No. 521,436, Jan. 18, 1966. This application Mar. 18, 1969, Ser. No. 808,316

The portion of the term of the patent subsequent to Sept. 9, 1986, has been disclaimed Int. Cl. A61k 27/00

U.S. Cl. 424—330          9 Claims

ABSTRACT OF THE DISCLOSURE

Para-allyl substituted phenoxy-isopropylaminopropane, its preparation, pharmaceutical compositions containing this compound, and the use thereof in the treatment of cardiac and vascular diseases.

---

This application is a continuation-in-part of our copending application Ser. No. 558,226 filed June 17, 1966, now U.S. Pat. 3,466,376, which in turn is a continuation-in-part of our application Ser. No. 521,436 filed Jan. 18, 1966, now U.S. Pat. 3,466,325.

The principal object of this invention is to provide a new alkenylphenoxy-hydroxyalkyl isopropylamine having valuable pharmacological properties.

It is still a further object of the invention to provide a new compound which can be formulated into pharmacological preparations in dosage units.

Another object of the invention is to provide a compound which may be employed in the treatment of cardiac and vascular diseases.

It is a still further object of the invention to provide a medicinal compound which can be used to protect a patient's heart against excessive sympathetic stimulation.

It is a still further object of the invention to provide a new medicinal compound which can be used in the treatment of cardiac and vascular diseases to protect the patient's heart against increased blood levels of epinephrine and norepinephrine.

A particular object of the invention is to provide a compound which has a much weaker blocking effect on the β-receptors of the bronchia and the smooth muscles of the blood vessels than on the β-receptors of the heart muscles. This means that the desired compound will have a more specific activity toward the heart, a property which in many cases is of significant importance in clinical use; for example, in treating patients who also have an asthmatic condition.

It is a further object of the invention to provide a novel compound for the treatment of cardiovascular diseases which has local anesthetic effects.

These and other related objects are achieved by providing a new allylphenoxy-hydroxylalkyl isopropylamine characterized by the general formula:

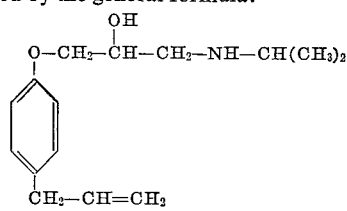

The allylphenoxy-2-hydroxy-3-isopropylamino-propane described above (sometimes referred to herein as the "para isomer" as distinguished from the "ortho isomer" in which the allyl group is in the ortho position) may be conveniently prepared by a process which comprises reacting an allylphenoxy-2,3-epoxypropane, which may be represented by the formula

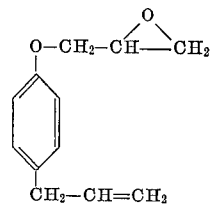

with a compound containing an active hydrogen atom and either an isopropylamino group or an atom or group of atoms which is capable of being converted into an isopropylamino group. These reactants may be characterized by the formula: H—X, wherein X may be a halogen atom or an amino group such as isopropylamine. When X is an unsubstituted amino group, the resulting product can then be isopropylated by techniques which are well known; for example, by carrying out a reductive isopropylation in the presence of acetone and a reducing agent such as sodium borohydride, potassium borohydride, lithium aluminum hydride, and the like.

Since the new compound described above contains an asymmetric carbon atom, it exists in optically active forms which can be resolved into optical antipodes, the dextro and levo forms, by well known techniques employing e.g. optically active acids.

The allylphenyl-2,3-epoxypropyl ether described above may be prepared by reacting allylphenol with an epihalohydrin such as epichlorohydrin.

The allylphenoxy-isopropanolamine disclosed herein has been shown to possess valuable pharmacological properties. At relatively low dosage levels it has been found to block the effect of intravenously administered cardiac stimulants, such as isoprenaline, and the effects of sympathetic stimulation of the heart and the fat tissue. It is, in particular, very useful in alleviating the effects of angina pectoris and in lowering blood pressure.

The acute and chronic toxicity of this compound is very low, and experiments show that it is well absorbed from the gastrointestinal tract and that its effect is of long duration. The compound may, therefore, be clinically used, in particular for the treatment of cardiac and vascular diseases under conditions such that the heart has to be protected against excessive sympathetic stimulation; e.g., during mental stress or muscular work, circumstances which are known to increase the level of the sympathomimetic amines epinephrine and norepinephrine in the blood. This is especially so in the case of patients also suffering from asthma, for other beta blocking drugs such as Inderal or Aptin (the ortho isomer of the compound disclosed herein) should not be administered to such patients. Furthermore, the substance has blood pressure lowering activity in patients suffering from hypertension.

The compound of the invention will normally be administered orally, rectally or by injection, in the form of pharmaceutical preparations comprising the active ingredient either as a free base or as a pharmaceutically acceptable nontoxic, acid addition salt, e.g., the hydrochloride, lactate, acetate, sulfamate, and the like, in association with a pharmaceutically acceptable carrier. Accordingly, terms relating to the novel compound of this invention whether generically or specifically are intended to include both the free amine base and the acid addition salts of the free base, unless the context in which such terms are used, e.g. in the specific examples, would be inconsistent with the broad concept. The carrier may be a solid, semisolid or liquid diluent or an ingestible capsule. These pharmaceutical preparations constitute a further aspect of this invention. Usually the active substance will constitute between 0.1 and 95% by weight of the preparation, more specifically between 0.5 and 20% by weight for preparations intended for injection and between 2 and 50% by weight for preparations suitable for oral administration.

To produce pharmaceutical preparations containing a compound of the invention in the form of dosage units for oral application, the compound may be mixed with a solid pulverulent carrier, e.g., lactose, saccharose, sorbitol, mannitol, starches such as potato starch, corn starch, amylopectin, laminaria powder or citrus pulp powder, cellulose derviatives, or gelatin, and a lubricant such as magnesium stearate, calcium stearate, polyethylene glycol waxes, and the like, and then compressed to form tablets. If coated tablets are required, the cores, prepared as described above, may be coated with a concentrated sugar solution which may contain, e.g., gum arabic, gelatin, talcum, titanium dioxide, and the like. Alternatively, the tablet can be coated with a lacquer dissolved in a readily volatile organic solvent or mixture of organic solvents. Dyestuffs may be added to these coatings in order readily to distinguish between tablets containing different active substances or different amounts of the active compound.

For the preparation of soft gelatin capsules (pearl-shaped closed capsules) consisting of gelatin and, e.g., glycerol, the active substance may be admixed with a vegetable oil. Hard gelatin capsules may contain granulates of the active substance in combination with solid, pulverulent carriers such as lactose, saccharose, sorbitol, mannitol, starches (e.g., potato starch, corn starch or amylopectin), cellulose derivatives or gelatin.

Dosage units for rectal application can be prepared in the form of suppositories comprising the active substance in admixture with a neutral fatty base, or gelatin rectal capsules comprising the active substance in admixture with vegetable oil or paraffin oil.

Liquid preparations for oral application may be in the form of syrups or suspensions, for example, solutions containing from about 0.2% to about 20% by weight of the active substance, herein described, the balance being sugar and a mixture of ethanol, water, glycerol, and propylene glycol. Optionally such liquid preparations may contain coloring agents, flavoring agents, saccharine and carboxymethylcellulose as a thickening agent.

Solutions for parenteral applications by injection can be prepared in an aqueous solution of a water-soluble pharmaceutically acceptable salt of the active substance preferably in a concentration of from about 0.5% to about 10% by weight. These solutions may also contain stabilizing agents and/or buffering agents and may conveniently be provided in various dosage unit ampules.

The following examples illustrate the principles and practice of the instant invention.

EXAMPLE 1

Epichlorhydrin (5.5 grams) was added to a solution containing 4 grams of p-allylphenol and 2 grams of sodium hydroxide in 25 milliliters of water. The resulting mixture was stirred overnight and the reaction product then extracted with ether. The ether solution was dried over magnesium sulphate and evaporated to provide 6.5 grams of a reaction product residue (p-allylepoxypropoxy-benzene) which was used without further purification.

A mixture of 6.5 grams of isopropylamine, 6.5 grams of isopropanol, and 6.5 grams of the p-allylepoxypropoxy-benzene was refluxed with continual stirring for about 4 hours. The isopropanol and unreacted isopropylamine were then removed by distillation. The resulting reaction product was dissolved in 2 M. hydrochloric acid, and the solution was washed with ether. The acid solution was then made alkaline, and the amine thus libtrated was extracted with ether. The ether solution was then dried over potassium carbonate and the excess solvent evaporated. The 1-(p-allylphenoxy)-2-hydroxy-3-isopropylaminopropane was then recrystallized twice from petroleum ether (boiling range 40° C. to 60° C.) to provide 2.9 grams of a product having a melting point of 55° C.

The corresponding hydrochloride was prepared by dissolving 2 grams of the product, prepared above, in 20 milliliters of acetone, and adding to the resulting solution acetone saturated with hydrogen chloride until the pH was reduced to about 3. The precipitated hydrochloride salt was then recrystallized from acetone to yield 1.5 grams of a material having a melting point between 107° C. and 109° C.

The following examples illustrate the preparation of pharmaceutical formulations containing the active ingredients of this invention.

EXAMPLE 2

A syrup containing 2% (weight per volume) of the active substance was produced from the following ingredients:

1 - (p-allylphenoxy) - 2 - hydroxy - 3-isopropylaminopropane HCl—2.0 g.
Saccharin—0.6 g.
Sugar—30.0 g.
Glycerol—5.0 g.
Flavoring agent—0.1 g.
Ethanol 96%—10.0 ml.
Distilled water to 100.0 ml.

The sugar, saccharin and the ether salt were dissolved in 60 grams of hot water. After cooling, the glycerol and a solution of the flavoring agent in ethanol was added. The fixture was then made up to a volume of 100 milliliters with water.

The active substances shown above may be replaced by other pharmaceutically acceptable acid addition salts.

EXAMPLE 3

Two hundred and fifty grams of 1-(p-allylphenoxy)-2-hydroxy-3-isopropylaminopropane hydrochloride were mixed with 175.8 grams of lactose, 169.7 grams of potato starch and 32 grams of colloidal silica. The mixture was moistened with a 10% gelatin solution and granulated through a 12 mesh sieve. After drying, 160 grams of potato starch, 50 grams of talc, 2.5 grams of magnesium stearate were mixed in and the resulting mixture was pressed into tablets (10,000) containing 25 milligrams of active substance which were suitable for use as tablets. The tablets were marked with break lines to enable a dose other than 25 milligrams or multiples thereof to be administered.

EXAMPLE 4

One gram of 1-(p-allylphenoxy)-2-hydroxy-3-isopropylaminopropane hydrochloride, 0.8 gram of sodium chloride and 0.1 gram of ascorbic acid were dissolved in sufficient distilled water to make 100 milliliters of solution, each milliliter of which contained 10 milligrams of the active substance, was used to fill ampules which were sterilized by heating for 20 minutes at 120° C.

The allylphenoxy-propoxy-isopropanolamine described herein, including the optical isomers and racemic mixtures thereof, has been shown to possess valuable pharmacological properties. In low doses they block the effect of intravenously administered isoprenaline as well as the effects of sympathetic stimulation on the heart, while at the same time having minimal effect on the bronchia and the smooth muscles of the blood vessels.

In determining the approximate toxicity in mice, male mice weighing 25–30 grams were used. The animals were observed for 72 hours. Comparisons were made with the ortho isomer are shown in the table.

TABLE 1

Toxicity in mouse LD$_{50}$

| I.p. administration: | Mg./kg. |
|---|---|
| Para isomer | 110 |
| Ortho isomer | 130 |

EXAMPLE 5

β-blocking activity on anesthetized, reserpinized, vagotomized and adrenalectomized cat The mean arterial blood pressure, heart rate, cardiac contractile force (by means of a strain gauge arch sutured to the right ventricle) and peripheral vascular resistance in a hind leg (perfusion pressure recorded under constant flow delivered by sigma motor pump) were recorded.

The β-blocking potency of the two drugs was determined by testing how increasing doses influenced responses to a dose of i.v. injected isoprenaline (β-receptor stimulant). Potency comparisons were based on doses of the test substances (ortho and para isomers) giving 50% blockade of the effect of isoprenaline (ED$_{50}$).

Further the intrinsic β-stimulating doses were determined.

The procedure was as follows:

Cats weighing between 2.5 and 5.0 kg. were anesthetized with pentobarbital sodium (30 mg./kg. i.p.). The chest was opened and the lungs were artificially respirated. Laparatomy was performed and both adrenal glands were removed. Both vagal nerves were cut in the neck. Arterial blood pressure was recorded from a cannula in one carotid artery connected to a Statham transducer. Heart rate was recorded by a cardiotachometer triggered by the ECG of the animal. The recordings were made on an Offner dynograph.

The animals were pretreated with reserpine (5 mg./kg. i.m.) about 18 hours before the experiment. This treatment probably produced practically complete depletion of myocardial catecholamines since repeated controls showed that the heart did not respond to strong electrical stimulation of the stellate ganglia nor did the heart contain any measurable amount of catecholamines.

The results are presented in the following table.

TABLE 2.—BLOCKADE OF THE EFFECT OF ISOPRENALINE ON CAT (DOSE GIVING 50% BLOCKADE OF CONTROL RESPONSE)

| | Ortho isomer, mg./kg. i.v. | Para isomer, mg./kg. i.v. |
|---|---|---|
| Heart rate (positive chronotropic effect) | 0.02 | 0.06 |
| Cardiac contractile force (positive inotropic effect) | 0.06 | 0.2 |
| Blood pressure (lowering effect) | 0.01 | 2.5 |
| Peripheral vascular resistance | 0.04 | 3.6 |
| Intrinsic β-receptor stimulation, percent of max. isoprenaline response | 24 | 29 |

EXAMPLE 6

Anesthetized cats

By this test an evaluation of the two drugs influence on the pressor response to i.v. injected adrenaline was made. The β-receptor blocker was administered in increasing amounts. Ten minutes after each dose adrenaline was injected in a dose that gave an increase in blood pressure amounting to about 30 mm. Hg in a control test. Table 3 shows the mean results obtained which indicate that the para isomer does not potentiate the pressor effect of adrenaline to the same degree as the ortho isomer does.

TABLE 3

| Dose mg./kg. i.v. | Ortho isomer | | Para isomer | | Control | |
|---|---|---|---|---|---|---|
| | Response to adrenaline, mm.Hg | Maximal B.P. level during adrenaline effect, mm.Hg | Response to adrenaline, mm.Hg | Maximal B.P. level during adrenaline effect, mm.Hg | Response to adrenaline, mm.Hg | Maximal B.P. level during adrenaline effect, mm.Hg |
| 0 [1] | 31 | 177 | 32 | 181 | 27 | 165 |
| 0.125 | 64 | 208 | 40 | 184 | 27 | 167 |
| 0.25 | 66 | 206 | 42 | 183 | 28 | 162 |
| 0.5 | 72 | 203 | 48 | 184 | 32 | 160 |
| 1.0 | 80 | 202 | 55 | 185 | 32 | 156 |
| 2.0 | 91 | 194 | 66 | 187 | 36 | 153 |
| 4.0 | 90 | 183 | 64 | 176 | 32 | 146 |

[1] Control.

EXAMPLE 7

Isolated spirally cut tracheal smooth muscle from guinea pig

The influence of the blockers on isoprenaline-induced relaxation was tested. The method used was originally described by Castillo & Beer J Pharmacol. Experimental Therap. 90 (1947) 104, modified by Constantin J. Pharm. Pharmacol. 17 (1965), 384. Both agents antagonized the isoprenaline response. The relation between equipotent doses of the para isomer and the ortho isomer was 100/1, respectively.

EXAMPLE 8

Interaction of the para isomer and the ortho isomer with isoprenaline on the mortality of guinea pigs exposed to a histamine aerosol The method used was developed by Konzett & Rossler Arch. Exp. Pat. Pharmak. 195 (1940), 71. The β-blocker to be tested was injected (s.c.) 15 minutes before exposure to histamine aerosol. Results are shown in Table 4.

TABLE 4

| Antagonist dose, mg./kg. | Isoprenaline, 0.05 mg./kg. | Mortality, dead/tested |
|---|---|---|
| None | − | 8/8 |
| Ortho 0.05 | + | 1/4 |
| Ortho 0.1 | + | 4/4 |
| Para 2 | + | 2/3 |
| Para 4 | + | 4/4 |
| None | + | 1/8 |

Isoprenaline (a β-receptor stimulant and therefore bronchodilating agent) protects the animals against histamine-aerosol.

Both β-blockers counteract this effect of isoprenaline; the para isomer, however, at doses which are 40 times higher than the ortho isomer. Parameter: death of the animals in bronchoconstriction.

The conclusions to be drawn from the foregoing tests are that the para isomer is about 3 times weaker than the ortho isomer as regards cardiac β-receptor blockade. The β-blocking activity of the para isomer in vascular and tracheal smooth muscle was only $1/100$ to $1/40$ of that of the ortho isomer. This indicates a clinical advantage for the para over the ortho isomer when the cardiac β-blockade is utilized therapeutically, because the β-blockade in smooth muscle may be disadvantageous.

The para isomer has an intrinsic cardiac stimulating action of the same order as the ortho isomer which may be of value when treating patients with latent cardiac failure.

With respect to dosages, clinical tests have shown as reported in the parent application, of which the present application is a continuation-in-part, that the ortho isomer may be administered orally in single or individual daily doses for a period of up to 10 consecutive days. Four daily oral doses of 40 mg. have been used. For two patients a total dosage of 360 mg. was administered in three equal doses during one day. Five patients with minor cardiovascular disorders were studied after a single oral dose of 40 mg. In another case oral doses were 10 to 40 mg. in divided doses. In still other tests, the ortho isomer was administered orally at a dose of 0.5 mg. per kg. of body weight (total dose 40 mg.). In still other trials, work load tests were carried out one hour after oral administration of 0.75 mg. per kg. of body weight of the ortho isomer dissolved in water (total dose 60 mg.). In intravenous injections, the ortho isomer was administered in the dosage of 0.5 mg./kg. dissolved in 100 ml. of water. Two tablets containing 20 mg. of the ortho isomer were administered in a double blind test.

As noted, however, the para isomer has a weaker effect than the ortho isomer and it would, therefore, be necessary to increase the dosage 2 to 3 times the dosages disclosed for the ortho isomer. Notwithstanding this, however, for the reasons explained above, the result and effect on the bronchia and the smooth muscles of the blood vessels would be substantially less than for the case of the ortho isomer.

Table 5 below contains pharmacological data comparing the ortho, meta and para isomers of allylphenoxy-hydroxyalkyl isopropylamine obtained in another series of tests.

TABLE 5.—EFFECTS OF POSITION ISOMERS OF THE ALLYL DERIVATIVES

| Compound (isomer) | Intrinsic heart stimulation [1] | Blockade of isoprenaline response [2], $ED_{50}$ mg./kg. | | Acute toxicity in mice, $LD_{50}$ mg./kg. |
| --- | --- | --- | --- | --- |
| | | Blood pressure | Positive chronotropic and inotropic response | |
| Ortho allyl | Very weak | 0.01 | 0.1 | 100 |
| Meta allyl | Weak | 0.02 | 0.2 | 115 |
| Para allyl | Very weak | 5 | 0.5 | 150 |

[1] Rabbit Langendorff heart.
[2] Hexamethonium treated cat i.v. administration.

The claims are:

1. A method for treating cardiovascular diseases which comprises administering to a host suffering from such disease an effective dose of para-allylphenoxy-2-hydroxy-3-isopropylaminopropane.

2. A method for overcoming the effect of increased blood levels of sympathetic amines which comprises administering to a host suffering from such condition an effective dose of para-allylphenoxy-2-hydroxy-3-isopropylaminopropane.

3. A method for treating hypertension which comprises administering to a host suffering from such condition an effective dose of para-allylphenoxy-2-hydroxy-3-isopropylaminopropane.

4. A method for treating cardiovascular diseases which comprises administering to a host who is suffering from such diseases and also from asthma an effective dose of para-allylphenoxy-2-hydroxy-3-isopropylaminopropane.

5. A method for treating angina pectoris which comprises administering to a host suffering therefrom an effective dose of para-allylphenoxy-2-hydroxy-3-isopropylaminopropane.

6. A pharmaceutical preparation which comprises a pharmaceutically acceptable carrier and from about 0.1 to about 95% by weight of para-allylphenoxy-2-hydroxy-3-isopropylaminopropane.

7. An injectable pharmaceutical preparation which comprises from about 2 to about 50% by weight para-allylphenoxy-2-hydroxy-3-isopropylaminopropane.

8. A pharmaceutical preparation for parenteral application which comprises an aqueous solution of a water soluble salt of para-allylphenoxy-2-hydroxy-3-isopropylaminopropane in an amount of about 0.5 to about 10% by weight.

9. A pharmaceutical preparation for oral administration containing para-allylphenoxy-2-hydroxy-3-isopropylaminopropane in combination with a solid pharmaceutically acceptable diluent, said compound being present in the amount of from about 2 to about 50% by weight.

References Cited

UNITED STATES PATENTS 3,317,553   5/1967   Crowther et al.

FOREIGN PATENTS 641,133   11/1963   Belgium.
650,719   6/1964   Belgium.
1,394,771   4/1965   France.
900,164   8/1964   Ireland.
170,307   2/1960   Sweden.
181,297   11/1962   Sweden.
181,732   11/1962   Sweden.

OTHER REFERENCES

Petrow et al., Journal of Pharmacy & Pharmacology, 8 (1956), pp. 66–675.

STANLEY J. FRIEDMAN, Primary Examiner

U.S. Cl. X.R.

260—570.7

PO-1050
(5/69)

UNITED STATES PATENT OFFICE
CERTIFICATE OF CORRECTION

Patent No. 3,555,161          Dated January 12, 1971

Inventor(s) Arne Elof Brandstrom, Hans Rudolf Corrodi, and Bengt Arne Hjalmar Ablad It is certified that error appears in the above-identified patent and that said Letters Patent are hereby corrected as shown below:

Column 3, line 75, "libtrated" should be -- liberated --;

Column 4, line 61, should read -- tion. This solution, each milliliter of which contained 10 milligrams of --;

Column 4, line 74, delete "were";

Column 6, line 36, after "(s.c.)" insert -- 30 minutes and isoprenaline (s.c.)--.

Signed and sealed this 24th day of August 1971.

(SEAL)
Attest:

EDWARD M. FLETCHER, JR.
Attesting Officer

WILLIAM E. SCHUYLER, JR.
Commissioner of Patents